Jan. 31, 1967  E. F. BRADY  3,301,615
ROLLING BEARINGS
Filed Sept. 10, 1964
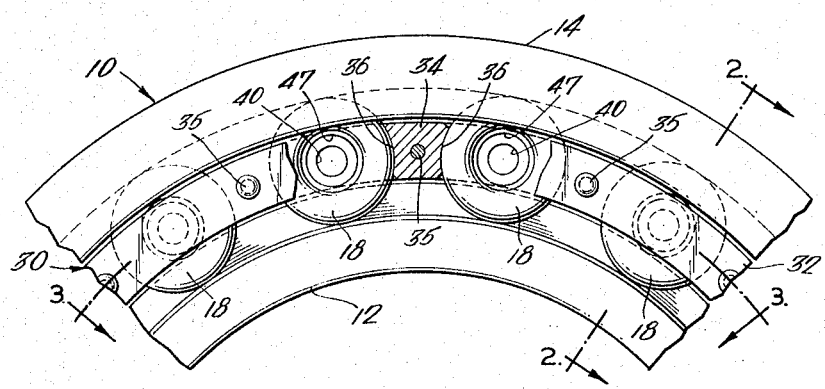
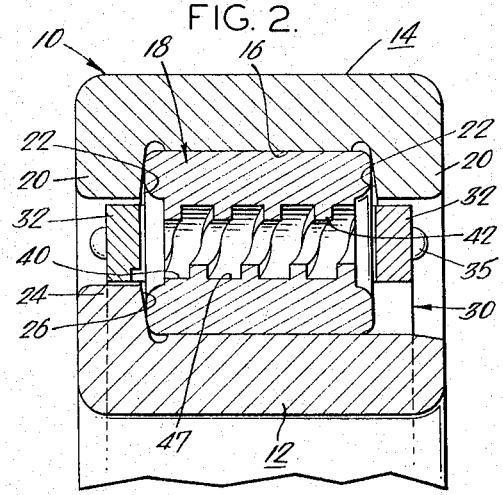
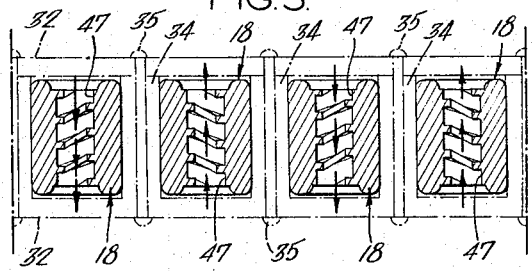
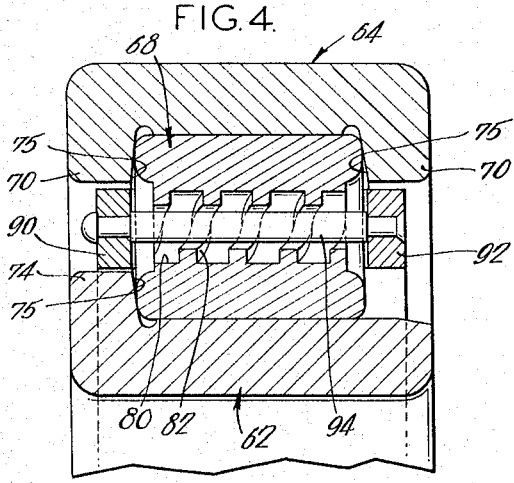
INVENTOR:
EUGENE F. BRADY
BY Howson & Howson
ATTYS.

United States Patent Office 3,301,615
Patented Jan. 31, 1967

3,301,615
ROLLING BEARINGS
Eugene F. Brady, Drexel Hill, Pa., assignor to SKF Industries, Inc., King of Prussia, Pa., a corporation of Delaware
Filed Sept. 10, 1964, Ser. No. 395,527
8 Claims. (Cl. 308—187)

This invention relates to improvements in rolling bearings. More particularly, the present invention relates to a roller bearing assembly which is characterized by novel features of construction and arrangement providing for good lubrication of elements of the bearing assembly especially in critical areas thereof such as the contact zone where the rollers engage the flanges of the rings.

One of the factors contributing to premature failure of bearings generally is poor lubrication of the elements of the assembly. This is especially true of roller bearing assemblies, for example, of the type wherein the inner and/or outer rings have flanges against which the rollers abut. In these assemblies one of the particular problems contributing to failure is the so-called "smearing" phenomena which is in the nature of seizing caused by two surfaces sliding on each other. In roller bearing assemblies, smearing can develop between the roller end faces and the flanges due, for example, to the bearing being poorly located in the contact zone of the end faces of the rollers and the flanges. Smearing is in the nature of a surface distress which over a period of time decreases the thrust capacity of the bearing and contributes to premature failure of the bearing assembly; in other words, an important factor affecting life of the entire assembly.

With the foregoing in mind, it is an object of the present invention to provide an improved roller bearing construction wherein good lubrication of the bearing is assured. To this end, in accordance with the present invention there is provided a roller bearing assembly characterized by novel features of construction providing for good lubrication of the assembly especially in the critical contact zone of the rollers and the end flanges of the race rings whereby one of the major causes of bearing fatigue is eliminated and thus, the thrust capacity of the bearing and the service life thereof are greatly extended. In the present instance this is accomplised by providing rollers, each having a central bore extending from end to end, the bore being provided with a continuous helical screw thread. The helical screw threads of adjacent rollers are preferably turned opposite to one another so that upon rotation of the rollers, lubricant which is received in the threaded internal bore of the rollers is continuously delivered or is pumped in opposite directions thereby insuring good lubrication in the contact zone between the axial ends of the rollers and the flanges on either side thereof. The threaded internal bore serves as a pump to continuously deliver lubricant into the contact zone at the roller flange upon rotation of the roller elements in the annular space between the rings during operation of the bearing. By positive introduction of the lubricant at the critical bearing surface or contact zone, the occurrence of smearing is greatly inhibited thereby increasing the fatigue life and the thrust capacity of the bearing assembly. This construction insures good circulation of the lubricant, thereby maintaining lower temperature of the lubricant and the overall operating temperature of the bearing at reduced levels.

The flanges of the rings preferably have tapered load bearing surfaces confronting the ends of the rollers and the annular ends of the rollers are preferably rounded or curved slightly. By this arrangement the thrust load capacity of the bearing is increased considerably and the relationship of the load-bearing flange angle of the taper and the radius of the rounded ends of the rollers is such that the tendency of the rollers to misalign or skew is minimized. Moreover, it has been found that under load, a semi-elliptical area of contact exists between the rounded end face of the rollers and the tapered load-bearing flange at a point on the flange substantially below the terminal edge thereof. Thus, the roller contact with the load bearing surface of the flange is adjacent the base of the flange thereby substantially reducing rubbing velocity and providing low friction in the overall operation. In this regard it is noted that friction is reduced under all roller velocities thereby resulting in reduced heat generated. Thus, there is a decreased demand on lubricant and a significant reduction in the tendency in the roller end face and flange to weld, smear, pull or scuff.

With the foregoing in mind, an object of the present invention is to provide a bearing assembly characterized by novel features of construction and arrangement, providing good and effective lubrication of the elements of the bearing especially in the critical contact zones thereof.

A further object of the present invention is to provide a bearing assembly which is of relatively simplified construction and which has good resistance to smearing thereby increasing the service life of the entire assembly.

These and other objectives of the present invention and the various specific details of the construction of a bearing assembly in accordance with the present invention are hereinafter more fully set forth with reference to the accompanying drawing, in which:

FIG. 1 is a fragmentary side elevational view partly in section of a roller bearing constructed in accordance with the present invention;

FIG. 2 is an enlarged sectional view taken on lines 2—2 of FIG. 1;

FIG. 3 is a schematic sectional view taken on lines 3—3 of FIG. 1; and

FIG. 4 is a view similar to FIG. 2 illustrating a modified form of bearing assembly in accordance with the present invention.

Referring now to the drawing, the present invention is illustrated in connection with a cylindrical roller bearing assembly. However, it is to be understood that the principle of the invention applies as well to various other types of rolling bearing assemblies, for example, tapered roller bearings.

Considering now the cylindrical roller bearing illustrated, the bearing assembly which is generally designated by the numeral 10, comprises inner and outer rings 12 and 14 respectively which are radially spaced apart to define an annular space 16 for a plurality of roller elements 18. In the present instance the outer ring 14 has a radially inwardly extending flange 20 at opposite axial ends thereof, each of the flanges 20, 20 having, in the present instance, a tapered load bearing surface 22 confronting the axial ends of the rollers. The inner ring 12 in the present instance has at one axial end thereof a radially outwardly projecting annular flange 24 which also has a tapered load bearing surface 26 confronting one axial end of the rollers. A cage 30 is provided to circumferentially space the rollers, the cage 30 comprising a pair of annular rings 32 and a plurality of cross pieces 34 in the present instance formed integrally with one of the rings 32, which cross pieces 34 extend between the annular rings and are circumferentially spaced apart to define pockets 36 for the rollers. As illustrated, the annular rings are secured in assembled relation by means of pins 35.

In accordance with the present invention, means is provided for insuring good lubrication of the bearing especially in the critical zones of contact between the roller ends and the tapered load bearing surface. To this end, each of the rollers is provided with a bore 40 in the present instance which extends from end to end and the bore is provided with fluid directing means coordinated relative to the bore to deliver lubricant in the bore to at least one axial end of the roller upon rotation of the roller about its axis. In the present instance, the fluid directing means comprises a continuous helical screw thread 42 which, in the present instance is of square cross section. The helical screw thread defines a helical channel 47 for lubricant so that as the rollers rotate on their axes of rotation during operation of the bearing, any lubricant in the bore is pumped to one axial end of the roller into the critical contact zone between the end face of the roller and the load bearing flanges. Preferably, the rollers are oriented so that every other roller has a right-hand screw thread and the intermediate rollers have left-hand screw threads. By this arrangement, lubricant is pumped to both sides of the rollers and insures good lubrication of the contact zones on opposite sides of the rollers. As illustrated, the annular roller end faces are preferably rounded which combined with the tapered load bearing flanges provide the functional advantages noted above.

The bearing assembly of the present invention is adapted for use in applications where the bearing is lubricated by means of an oil bath in which a part of the assembly is immersed or in applications where the bearing is subjected to lubrication by spray units. In the case of an oil bath, the rollers which rotate on their own axis and also the axis of the bearing, pass successively through the oil bath and, while immersed in the bath, retain a certain amount of lubricant in the threaded bore 40. Accordingly, as the rollers move to a zone outside of the oil bath, they rotate on their own axis, and about the axis of the bearing whereby the lubricant retained in the bore 40 is moved or pumped continuously into the contact zone between the roller ends and the flanges. By selective orientation of the adjacent rollers in a manner so that the helical screw threads 42 face in opposite directions, continuous pumping of lubricant to both contact zones in the present instance at opposite ends of the bearing is assured. The same type of continuous lubrication applies in applications where, in some instances, the bearing is spray lubricated at a given location.

FIG. 4 illustrates another embodiment of a roller bearing constructed in accordance with the present invention. The overall configuration of the bearing is substantially similar to that shown in FIGS. 1-3 and as illustrated, includes an inner ring 62, an outer ring 64 and a plurality of rollers 68 in the annular space between the rings. The outer ring has radially inwardly projecting flanges 70, 70 and the inner ring has a radially outwardly projecting flange 74 at one axial end thereof. All of the flanges have load bearing surfaces 75 facing or confronting the ends of the rollers which as illustrated, are tapered. Further, as illustrated, each of the rollers has a central bore 80 extending from end to end and a continuous helical screw thread 82 for the purpose of pumping or delivering lubricant in the bore to the contact zone at an axial end of the roller. In the present instance however, the cage comprises a pair of rings 90 and 92 which are connected by a plurality of cross pieces 94 of circular cross section which as illustrated, engage through the bore of each of the rollers. By this arrangement the rollers are circumferentially spaced apart in the annular space.

The operation of the bearing assembly described is identical to that described above. In other words, if the bearing is used in an application where it is lubricated by an oil bath wherein a part of the bearing is immersed in the oil bath, the rollers on passing through the oil bath pick up a certain amount of lubricant in the bore 80 and by reason of the helical screw thread 82 and the fact that they are continuously rotating on their own axes, the lubricant retained in the bore is continuously delivered by a pumping action to the contact zone at one axial end of the rollers.

By this arrangement continuous lubrication of the bearing is assured from the time that the rollers emerge from the oil bath until they re-enter the oil bath. Preferably alternate rollers have a right-hand screw thread configuration and the rollers between the alternate rollers have a left-hand configuration. By this arrangement there is a continuous lubrication of the bearing assembly at adjacent contact zones at each end of the rollers.

Thus it is submitted that the present invention provides a novel improvement in roller bearing, especially those employing end flanges against which the rollers abut. The novel arrangement of the rollers provides for good continuous circulation of lubricant thereby minimizing failure of the roller bearing due to smearing. It has been found that by providing this lubrication feature, the fatigue life and overall service life of the bearing are extended considerably.

While particular embodiments of the present invention have been illustrated and described herein, it is not intended to limit the invention and changes and modifications may be made therein within the scope of the following claims.

I claim:
1. A rolling bearing assembly comprising a pair of rings spaced apart to define an annular space therebetween, a plurality of roller elements in said annular space, at least one of said rings having a radially projecting annular flange having a load bearing surface confronting one axial end of the rollers, means defining a bore in at least one of said roller elements, lubricant directing means in the form of a helical radially inwardly extending projection defining a continuous screw thread in said bore operable upon rotation of said one roller element on its axis to deliver substantially all lubricant in said bore continuously to an axial end of the roller confronting said annular flange thereby to lubricate the contact zone between the roller and the load bearing surface of said annular flange.

2. A rolling bearing assembly as claimed in claim 1, wherein said axial bore extends from end to end.

3. A rolling bearing assembly as claimed in claim 1, wherein one of said rings has a pair of radially projecting annular flanges at opposite ends thereof and the other ring has at least one radially projecting flange at one axial end thereof and wherein each of said flanges has a load bearing surface confronting the axial ends of the rollers.

4. A rolling bearing assembly as claimed in claim 3, wherein said load bearing surface is tapered, and wherein the annular ends of the rollers confronting and engaging said load bearing surfaces are rounded.

5. A rolling bearing assembly comprising inner and outer rings spaced apart to define an annular space therebetween, a plurality of roller elements in said annular space, at least one of said rings having a radially projecting annular flange having a load bearing surface confronting one axial end of the rollers, means defining a bore in each roller element, lubricant directing means in the form of a helical radially inwardly extending projection defining a continuous screw thread in said bore operable upon rotation of said roller element on its axis to deliver substantially all lubricant in said bore continuously to an axial end of the roller confronting said annular flange thereby to lubricate the contact zone between the roller and the load bearing surface of said annular flange and a cage comprising a pair of annular rings disposed on opposite sides of said rollers and a plurality of cross pieces connected to said annular rings at circumferentially spaced locations to define pockets for the roller elements.

6. A rolling bearing assembly as claimed in claim 5, wherein said cross pieces confront the outer periphery surface of the roller elements.

7. A roller bearing assembly as claimed in claim 5, wherein said cross pieces comprise a plurality of pins of circular cross section connecting said annular rings, the number of pins corresponding to the number of roller elements, each pin engaging through the axial bore of a roller element thereby to circumferentially space the rollers.

8. A rolling bearing assembly comprising inner and outer rings spaced apart to define an annular space therebetween, a plurality of roller elements in said annular space, at least one of said rings having a radially projecting annular flange at opposite axial ends thereof, each flange having a load bearing surface confronting an axial end of the rollers, means defining a bore in each roller extending from end to end, lubricant directing means in the form of a helical radially inwardly extending projection defining a continuous screw thread in said bore operable upon rotation of each of the rollers on its axis to deliver substantially all lubricant in said bore continuously to one axial end of the roller confronting an annular flange, the screw thread of some of said rollers being so arranged to pump lubricant in one axial direction in said rollers to lubricate the contact zone between these rollers and the load bearing surface of one of said annular flanges and the screw threads of the other rollers being so arranged to deliver substantially all lubricant in the bore of said other rollers continuously to an axial end of the rollers confronting the other annular flange thereby to lubricate the contact zone between the other rollers and the load bearing surface of the other annular flange.

References Cited by the Examiner
FOREIGN PATENTS

| | | |
|---|---|---|
| 181,316 | 12/1922 | Great Britain. |
| 302,836 | 11/1932 | Italy. |
| 302,903 | 11/1932 | Italy. |

MARTIN P. SCHWADRON, *Primary Examiner.*

FRANK SUSKO, *Examiner.*